United States Patent
Cieslinski

(10) Patent No.: US 8,154,637 B2
(45) Date of Patent: Apr. 10, 2012

(54) IMAGE SENSOR

(75) Inventor: Michael Cieslinski, Unterhaching (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 512 days.

(21) Appl. No.: 12/328,855

(22) Filed: Dec. 5, 2008

(65) Prior Publication Data

US 2009/0146196 A1 Jun. 11, 2009

(30) Foreign Application Priority Data

Dec. 7, 2007 (DE) .......................... 10 2007 058 973

(51) Int. Cl.
*H04N 3/14* (2006.01)
*H04N 5/335* (2011.01)

(52) U.S. Cl. ...... 348/301; 348/243; 348/300; 250/208.1

(58) Field of Classification Search .................. 348/243, 348/294–310; 250/208.1
See application file for complete search history.

(56) References Cited

U.S. PATENT DOCUMENTS

| | | | |
|---|---|---|---|
| 5,790,191 A | 8/1998 | Zhang | |
| 6,787,752 B2 | 9/2004 | Tsai | |
| 6,911,641 B2 | 6/2005 | Tsai | |
| 7,084,912 B2 | 8/2006 | Chieh | |
| 7,858,916 B2 * | 12/2010 | Yan | 250/208.1 |
| 2002/0154347 A1 * | 10/2002 | Funakoshi et al. | 358/513 |
| 2002/0186312 A1 * | 12/2002 | Stark | 348/302 |
| 2003/0052982 A1 | 3/2003 | Chieh | |
| 2004/0041931 A1 | 3/2004 | Tu et al. | |
| 2004/0135910 A1 * | 7/2004 | Nam | 348/308 |
| 2004/0141078 A1 * | 7/2004 | Yamaguchi | 348/308 |
| 2005/0062866 A1 | 3/2005 | Ang | |
| 2006/0231732 A1 | 10/2006 | Yan | |
| 2007/0228256 A1 | 10/2007 | Mentzer et al. | |

FOREIGN PATENT DOCUMENTS

| | | |
|---|---|---|
| DE | 44 96 504 T1 | 10/1995 |
| DE | 103 12 377 A1 | 10/2003 |
| DE | 103 38 700 B4 | 6/2004 |
| DE | 696 34 833 T2 | 3/2006 |
| EP | 1 724 837 A1 | 11/2006 |
| WO | WO-99/16238 | 4/1999 |
| WO | WO-2005/022459 A2 | 3/2005 |

OTHER PUBLICATIONS

German Search Report dated Sep. 15, 2008 German Patent Application No. 10 2007 058 973.7.

* cited by examiner

*Primary Examiner* — Anthony J Daniels
(74) *Attorney, Agent, or Firm* — Gifford, Krass, Sprinkle, Anderson & Citkowski, P.C.

(57) ABSTRACT

An image sensor, in particular a CMOS image sensor, for electronic cameras having a plurality of light-sensitive pixels which are arranged in rows and columns and whose signals are conducted via a plurality of column lines to column amplifiers, with a column amplifier being associated with each column line. At least one further column amplifier which is simultaneously also associated with at least one other column line is associated with the respective column line. A switching device switches the respective column line selectively to one of the associated column amplifiers.

27 Claims, 3 Drawing Sheets

IMAGE SENSOR

CROSS-REFERENCE TO RELATED APPLICATION

This application claims priority of German Patent Application No. DE 10 2007 058 973.7 filed Dec. 7, 2007.

BACKGROUND OF THE INVENTION

I. Field of the Invention

The present invention relates to an image sensor, in particular a CMOS image sensor, for electronic cameras having a plurality of light-sensitive pixels which are arranged in rows and columns and whose signals are conducted via a plurality of column lines to column amplifiers, with a column amplifier being associated with each column line.

II. Description of Related Art

Known electronic cameras include an image sensor which comprises a plurality of light-sensitive elements or pixels which are arranged in rows and columns and which convert light incident through a lens of the camera into electrical signals. For the reading out of an image, each of the pixels is addressed, with each pixel corresponding to a respective picture element of the image, and a signal which is proportional to a charge of the pixel collected by an exposure is conducted to an output of the image sensor.

Such an image sensor has a separate row selection line for each row and at least one separate column line for each column.

The reading out of such an image sensor usually takes place linewise, i.e. line for line. For this purpose, the pixels of the respective row are switched to the column lines by means of the respective row selection line. A separate column amplifier is associated with each of the column lines to amplify the signals of the selected pixels applied to the column lines. The amplified signals are then conducted to the output via a multiplexer device or—if a plurality of outputs are provided, as is preferred to achieve a high picture rate—to the outputs of the image sensor. The named column amplifiers are therefore arranged between the light sensitive elements and the multiplexer device with respect to the signal readout direction.

To achieve a high dynamic range for the image sensor, the pixels and the column amplifiers are made with very low noise and thus particularly sensitive. Small signal aliasing thereby already results in an aliased brightness of the picture element corresponding to the respective amplified signal. Such a defect can, however, not be perceived by the eye provided that it occurs randomly.

If signal aliasing is, however, caused by a column amplifier, the defect occurs in all pixels of the column of the image sensor associated with the column amplifier and thus in all picture elements of the corresponding column of the image so that a vertical stripe becomes visible in the image which can be perceived by the eye. It is very probable due to the high number of column amplifiers that an individual column amplifier differs greatly from the other column amplifiers and causes such perceptible signal aliasing.

BRIEF SUMMARY OF THE INVENTION

It is the underlying object of the invention to provide an image sensor of the initially named kind which enables the occurrence of vertical stripes to be suppressed.

The object is satisfied by an image sensor having the features of claim 1 and in particular in that at least one further column amplifier is associated with the respective column line and is simultaneously also associated with at least one other column line, with a switching device being provided to switch the respective column line selectively to one of the associated column amplifiers and with a control device being provided for the control of the switching device.

It is therefore possible in accordance with the invention to switch the pixels associated with a column or with a column line to one of a plurality of column amplifiers. The signals of the pixels associated with the respective column line applied to the respective column line therefore do not always have to be amplified by the same column amplifier. The column amplifiers connectable to a respective column line for this purpose are called "associated" column amplifiers in connection with the invention.

With a corresponding control of the switching device by the control device, it can hereby be achieved that the defects in the image caused by a column amplifier no longer lie along a vertical line, but are spread over a plurality of columns of the image. A "scrambling" or "smearing" of such a vertical brightness defect is thus possible. It is even possible to completely bypass a defective column amplifier.

If at least some of the column amplifiers are associated with different column lines, the number of the column amplifiers required in total can be kept low. It is therefore preferred if a plurality of column lines is associated with each of the column amplifiers. In this case, a particularly simple design of the image sensor results since the number of the column amplifiers can correspond to the number of column lines. It is, however, generally also possible that the number of the column amplifiers is larger or smaller than the number of the column lines.

An advantageously simple design of the image sensor is also possible when the same number of column amplifiers is associated with each of the column lines.

To enable a particularly effective "scrambling" of a vertical brightness defect, it is preferred if at least four column lines, in particular at least eight column lines, are associated with each column amplifier.

The control device is preferably made to control the switching device such that the connection association of the column lines to the column amplifier varies from row to row.

In accordance with a preferred embodiment, the column lines of the image sensor are subdivided into a plurality of so-called association column groups with those column lines with which the same column amplifier is associated (or with which the same column amplifiers are associated) forming a respective such association column group. It is preferred with respect to such a subdivision of the sensor if at least some of the column amplifiers—in particular all of the column amplifiers—are associated with the column lines of a plurality of different association column groups. In other words, at least one association column group can be associated with each of the column amplifiers, with a respective association column group including those column lines which are selectively switchable to the respective column amplifier, with a plurality of association column groups being provided and with at least some of the column lines belonging to a plurality of different association column groups. With the exception of column lines of the marginal zones of the image sensor, all column lines preferably belong to a plurality of different association column groups. In the named embodiment, the association column groups are partly identical, for example they only differ by a respective one column line. This embodiment has the advantage that any vertical brightness defects caused by one of the column amplifiers are "smeared" particularly effectively in the horizontal direction without a group boundary being perceptible for the eye in the image.

It is in particular possible in this connection that the association column groups are interleaved with one another. In other words, a plurality of association column groups can be provided, with at least some of the association column groups overlapping one another. The perceptibility of group boundaries between different column groups is hereby avoided particularly effectively.

Image sensors are used in electronic cameras which simultaneously have a high number of pixels and a high frame rate which have a plurality of signal outputs with one respective output amplifier and can be read out in parallel—and thus faster. The columns or column lines can in this respect (alternatively or additionally to the aforesaid association column groups) be divided into readout column groups which each have a plurality of columns or column lines, with the number of columns or column lines in each of the readout column groups preferably corresponding to the number of the signal outputs. The signals of the respective associated pixels within the respective selected row of the image sensor are then switched to the outputs or to the output amplifiers of the image sensor via corresponding control signals column group-wise, i.e. readout column group by readout column group. The number of column lines of each readout column group in this respect preferably corresponds to the number of the output amplifiers and each column line belongs to precisely one of the readout column groups.

At least some of the column amplifiers—preferably all of the column amplifiers—are preferably associated with column lines of different readout column groups in this case. An occurrence of the defects in the image caused by one column amplifier is then not necessarily restricted to one readout column group. The perceptibility of group borders in the image can hereby be prevented.

In accordance with an advantageous further development, each of the column amplifiers associated with the respective column line has a connection probability with respect to the respective column line, with this connection probability corresponding to a relative frequency with which the respective column line—with respect to the different rows of the image sensor—is switched to the respective column amplifier. This connection probability can be calculated once, for example, for each column amplifier and can then be deposited in a stored look-up table. It can be ensured on the basis of such a preset connection probability that a possible vertical brightness defect is scrambled or smeared sufficiently effectively in the horizontal direction, in particular without perceptible edges.

The connection probability is preferably different for at least two of the column amplifiers. The frequency with which the respective column line is connected to the respective associated column amplifier is therefore not the same for all of the column amplifiers associated with the respective column line.

Furthermore, a preferred column amplifier with a highest connection probability can be assigned to each of the column lines. The remainder of the column amplifiers associated with the respective column line then has a respective connection probability which is smaller than the highest connection probability.

The control device is in particular made to control the switching device such that the connection probability of the column amplifiers associated with the respective column line to the respective column line is the smaller the further the respective column line is removed from that column line to which the respective column amplifier is assigned as the preferred column amplifier (with the highest connection probability). A gentle transition of the defects in the image caused by a column amplifier can hereby be achieved and an abrupt drop of the defects from one column in the image to the next column in the image can be avoided.

For example, for this purpose, the connection probability of the column amplifiers associated with the respective column line along the row direction of the image sensor can have a substantially Gaussian distribution, with the aforesaid preferred column amplifier as the reference point or center. Connection probabilities with Gaussian distribution can in particular be provided for the column amplifiers such that the Gaussian distributions of the different column amplifiers overlap with respect to the column lines, with the Gaussian distributions preferably being offset with respect to one another by one respective column.

To switch the respective column line selectively to one of the associated column amplifiers, it is preferred if the respective column line can be connected to each of the associated column amplifiers via a separate switch, with the switches connected to a respective column amplifier forming a switch group.

In accordance with a further development, a column selection circuit is provided by which at least some of the switches can be switched together with the jointly switchable switches including at most one switch of each switch group. Respective switches of the respective switch groups or column amplifiers can hereby be actuated uniformly in accordance with a common switching scheme, with the number of column selection control lines being able to be kept small.

The invention furthermore relates to a corresponding method for the reading out of an image sensor, in particular of a CMOS image sensor, for electronic cameras.

BRIEF DESCRIPTION OF THE DRAWING

Non-restricting embodiments of the invention are shown in the drawing and will be described in the following.

DETAILED DESCRIPTION OF THE INVENTION

Figure 1:
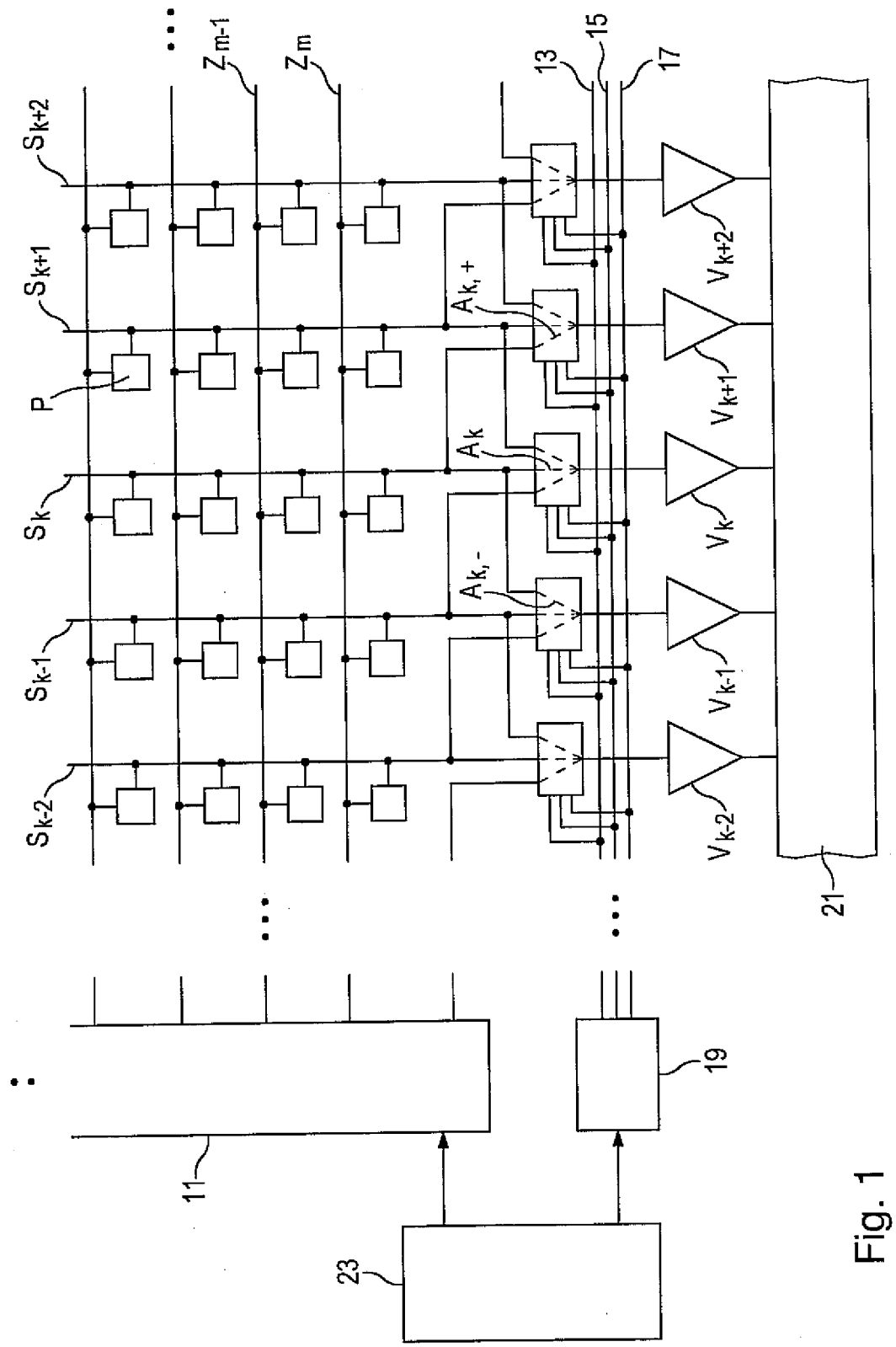
FIG. 1 shows a schematic part view of a first embodiment of an image sensor.

The image sensor shown schematically in FIG. 1 has a plurality of light sensitive pixels P which are arranged in rows (shown horizontally here) and columns (shown vertically here). For reasons of clarity, only one of the pixels P is provided with a reference symbol. Each row has a row selection line $Z_{m-1}$, $Z_m$ for the pixels P associated with the respective row and each column comprises a column line $S_{k-2}$, $S_{k-1}$, $S_k$, $S_{k+1}$, $S_{k+2}$ for the reading out of the pixels P associated with the respective column.

The image sensor furthermore includes a row selection circuit 11 by which a respective one of the rows can be selected for the reading out of the signals of the pixels P of this row. A so-called preferred column amplifier $V_{k-2}$, $V_{-1}$, $V_k$, $V_{+1}$, $V_{k+2}$ is associated with each column line $S_{k-2}$, $S_{-1}$, $S_k$, $S_{k+1}$, $S_{k+2}$ to amplify the signal of the pixel P of the respective selected row applied to the respective column line $S_{k-2}$, $S_{k-1}$, $S_k$, $S_{k+1}$, $S_{k+2}$. The preferred column amplifier $V_k$ is, for example, associated with the column line $S_k$.

Furthermore, the two column amplifiers $V_{k-1}$ and $V_{k+1}$, which are the preferred column amplifiers of the two adjacent column lines $S_{k-1}$ and $S_{k+1}$, are associated with each column line $S_k$ (here and in the following, for reasons of simplicity, only the reference symbol of the column line $S_k$ and the reference symbols to be used in connection with the column line $S_k$ will be set forth). In other words, the respective column line $S_k$ can selectively also be switched to the column amplifier $V_{k-1}$ or to the column amplifier $V_{+1}$.

It is understood that the associations explained above and also in the following between the column lines and the column amplifiers at the marginal zones of the image sensor are not absolutely necessary. In particular a plurality of columns whose pixels do not generate any wanted signal can be provided at the marginal zones. However, it is for example, also possible that the preferred column amplifier of the last column line (not shown) is associated with the first column line of the image sensor (likewise not shown) in addition to the separate preferred column amplifier and the preferred column amplifier of the second column line. The preferred column amplifier of the first column line can be associated with the last column line of the image sensor in addition to the separate preferred column amplifier and the preferred column amplifier of the penultimate column line. Alternatively, a respective further column amplifier which is not associated with any of the column lines as the preferred column amplifier can be provided for the first column line and for the last column line.

Each column line $S_k$ can selectively be switched to one of the associated column amplifiers $V_{k-1}, V_k, V_{k+1}$ to amplify the signal of the pixel P of the respective selected row applied to the respective column line $S_k$. For this purpose, three selection switches $A_{k,-}, A_k, A_{k,+}$ are associated with each column line $S_k$ to connect the respective column line $S_k$ selectively to one of the three column amplifiers $V_{k-1}, V_k, V_{k+1}$.

The selection switches $A_k$ which are associated with the column lines $S_k$ and which can connect the respective separate preferred column amplifiers $V_k$ to the respective column line $S_k$ are controllable by a column selection circuit 19 via a common column selection line 15. The selection switches $A_{k,-}$ and $A_{k,+}$ which are associated with the column lines $S_k$ and which can connect the respective preferred column amplifiers $V_{k-1}$ and $V_{k+1}$ of the adjacent column lines $S_{k-1}$ and $S_{k+1}$ to the respective column line $S_k$ are controllable by the column selection circuit 19 via common column selection lines 13, 17.

A multiplexer adjoins the column amplifier $V_k$ to conduct the signals amplified by the column amplifiers $V_k$ to outputs, not shown, of the image sensor. The multiplexer 21 can switch the column lines $S_k$ to a single output amplifier or to a plurality of output amplifiers.

The row selection circuit 11, the column selection circuit 19, the column selection lines 13, 15, 17 and the selection switches $A_{k,-}, A_k, A_{k,+}$ form part of a switching device of the image sensor which is controlled by a control device 23 of the image sensor, for example by a microcontroller.

The reading out of the image sensor in accordance with the invention shown in FIG. 1 will be described in the following.

The reading out takes place row-wise by application of corresponding address signals to the row selection circuit 11, with the row selection lines $Z_{m-1}, Z_m$ being addressed sequentially in rising order starting at a first row selection line located at an edge of the image sensor.

The reading out takes place column-wise per row or—provided that the column lines $S_k$ are divided into column groups—column group-wise. in this respect, in accordance with the control signals on the column selection lines 13, 15, 17, the respective column lines $S_k$ are selectively switched either to the preferred column amplifiers $V_{k-1}$ of the preceding column lines $S_{k-1}$ or to the separate preferred column amplifiers $V_k$ or to the preferred column amplifiers $V_{k+1}$ it of the following column lines $S_{k+1}$, i.e. each column line $S_k$ is selectively connected to one of the associated column amplifiers $V_{k-1}, V_k$ or $V_{k+1}$.

This connection association of the column lines $S_k$ to the column amplifiers $V_{k-1}, V_k, V_{k+1}$ is now varied from row to row so that the signals of the pixels associated with the respective column line $S_k$ applied to the respective column line $S_k$ are not always amplified by the same column amplifier $V_k$. The perceptibility of vertical stripes in an image possibly caused by one of the column amplifiers can hereby be suppressed.

The respective column line $S_k$ is in this respect connected to each of the three associated column amplifiers $V_{k-1}, V_k, V_{k+1}$ with a specific connection probability. The preferred column amplifier $V_k$ has—as the name already suggests—the highest connection probability. The two column amplifiers $V_{k-1}$ and $V_{k+1}$ have a lower connection probability, but preferably one that is respectively the same. A "scrambling" or "smearing" of possible brightness defects caused by a respective column amplifier which runs out uniformly toward the sides hereby results overall—with respect to all rows of the image sensor. The named connection probabilities are preset by the control device 23 in this respect.

A particular advantage of the association shown in FIG. 1 between the column lines $S_k$ and the column amplifiers $V_k$ comprises the fact that each of the column amplifiers $V_k$ is associated with a plurality of column lines $S_k$ adjacent at both sides. The desired "scrambling" of possible brightness defects thus takes place for each column amplifier $V_k$ independently of its position without perceptible edges.

The use shown in FIG. 1 of three associated column amplifiers $V_{k-1}, V_k, V_{k+1}$ is only of exemplary nature. Generally, any other number—in particular a much larger number—of associated column amplifiers can be provided. For example, in addition to the preferred column amplifier, sixteen further column amplifiers can be associated (in a symmetrical arrangement of ±8) with a respective column line. The connection probability of the associated column amplifiers can, for example, have a Gaussian distribution around the preferred column amplifier.

Furthermore it is also not necessary that, on the connection association of a row, the respective column lines are switched to mutually corresponding associated column amplifiers. It is, for example, also possible that a column line is switched to the separate preferred column amplifier, whereas another column line within the same row is switched to the preferred column amplifier of the directly following column line.

Finally, it must still be noted with respect to FIG. 1 that a plurality of column lines—in particular two column lines—$S_k$ can be provided for each column of pixels P within the framework of the invention. It is also possible that a plurality of pixels P—in particular two pixels—of a row share a column line $S_k$, i.e. a single column line $S_k$ is provided for a plurality of columns. It is in particular also possible that a plurality of rows of the image sensor are read out in parallel over a plurality of column lines $S_k$.

Figure 2:
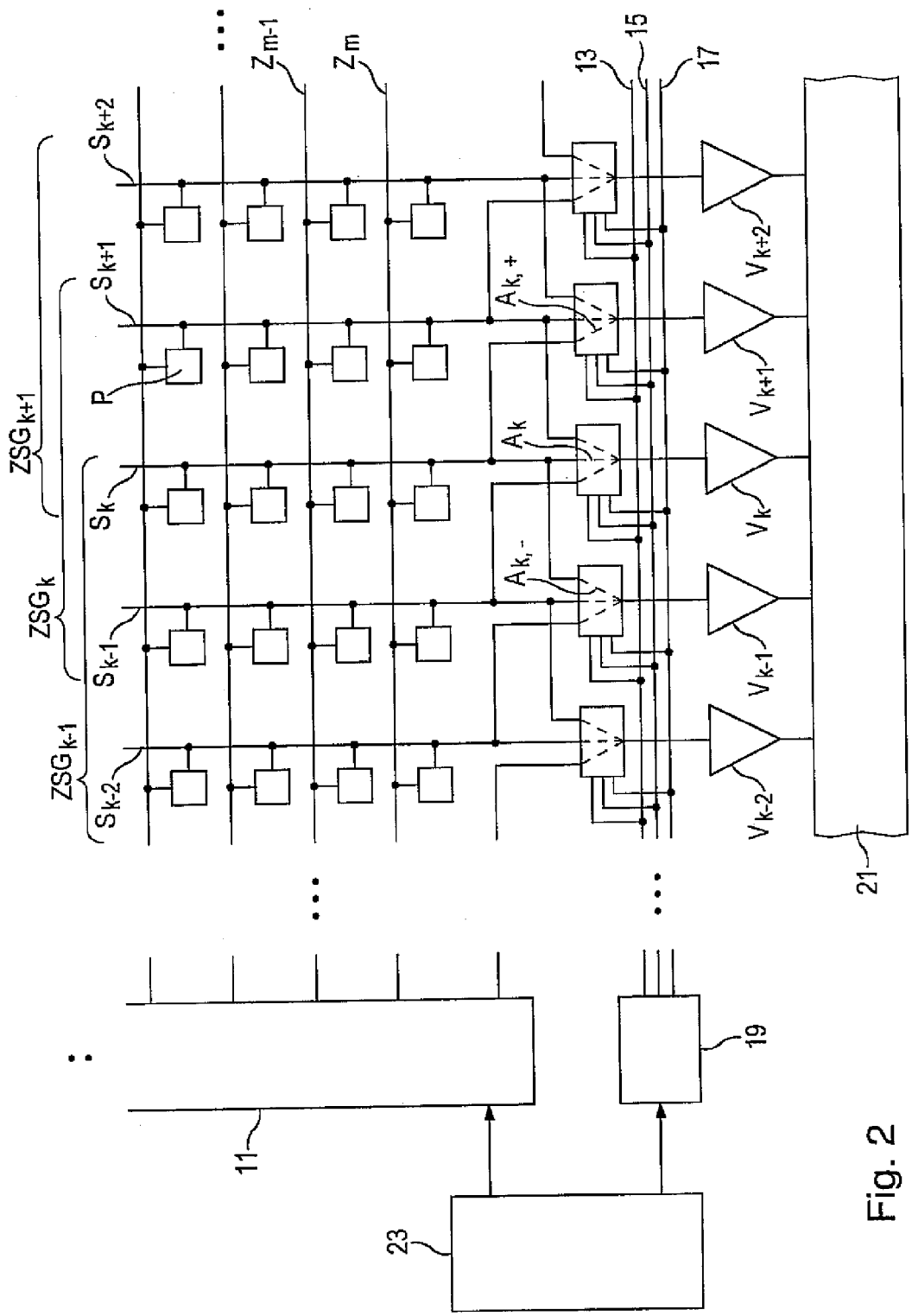
FIGS. 2 and 3 show further developments thereof.

FIG. 2 corresponds to the representation in accordance with FIG. 1. However, a division of the column lines $S_{k-2}, S_{k-1}, S_k, S_{k+1}, S_{k+2}$ into so-called association column groups $ZSG_{k-1}, ZSG_k, ZSG_{k+1}$ is provided here. These association column groups define the extent to which a possible brightness defect of a respective column amplifier $V_k$ can be "scrambled". The association column groups $ZSG_{k-1}, ZSG_k, ZSG_{k+1}$, however, do not necessarily correspond to the aforesaid division for the reading out of the pixel signals by column groups.

Three respective directly adjacent columns lines $S_{k-1}, S_k, S_{k+1}$ with which the same column amplifier $V_k$ is associated (i.e. which can be switched to the same column amplifier $V_k$), form a respective association column group $ZSG_k$. The number of the association column groups $ZSG_{k-1}$, $ZSG_k$, $ZSG_{k+1}$ substantially—namely apart from deviations which result from the lateral borders of the image sensor—corresponds to the number of the column amplifiers $V_{k-2}$, $V_{k-1}$, $V_k$, $V_{k+1}$, $V_{k+2}$.

In an analog manner as explained in connection with FIG. 1, the connection arrangement between the column lines $S_{k-1}$, $S_k$, $S_{k+1}$ and the column amplifiers $V_{k-1}$, $V_k$, $V_{k+1}$ varies from row to row. The pixel signals applied to the respective column line $S_k$ are thus not always amplified by the same column amplifier $V_k$ or the respective column amplifier $V_k$ does not always amplify the pixel signals of the same column line $S_k$.

The association column groups $ZSG_{k-1}$, $ZSG_k$, $ZSG_{k+1}$ are interleaved with one another, with two adjacent association column groups $ZSG_{k-1}$, $ZSG_k$ partly including the same column lines $S_{k-1}$, $S_k$ and only differing with respect to a respective column line $S_{k-2}$ or $S_{k+1}$. As can be seen from FIG. 2, the association column groups $ZSG_{k-1}$, $ZSG_k$, $ZSG_{k+1}$ therefore mutually overlap, with the mutually overlapping association column groups being mutually offset by a respective column line. It can furthermore be seen from FIG. 2 that each column amplifier $V_k$ is associated with the column lines $S_{k-1}$, $S_k$, $S_{k+1}$ of different association column groups $ZSG_{k-1}$, $ZSG_k$, $ZSG_{k+1}$. Any vertical brightness defects caused by one of the column amplifiers $V_k$ are hereby "smeared" particularly effectively in the horizontal direction without a group boundary being perceptible to the eye in the image. The perceptibility of group borders is therefore clearly reduced by the mutually overlapping arrangement of the association column groups $ZSG_{k-1}$, $ZSG_k$, $ZSG_{k+1}$.

Figure 3:
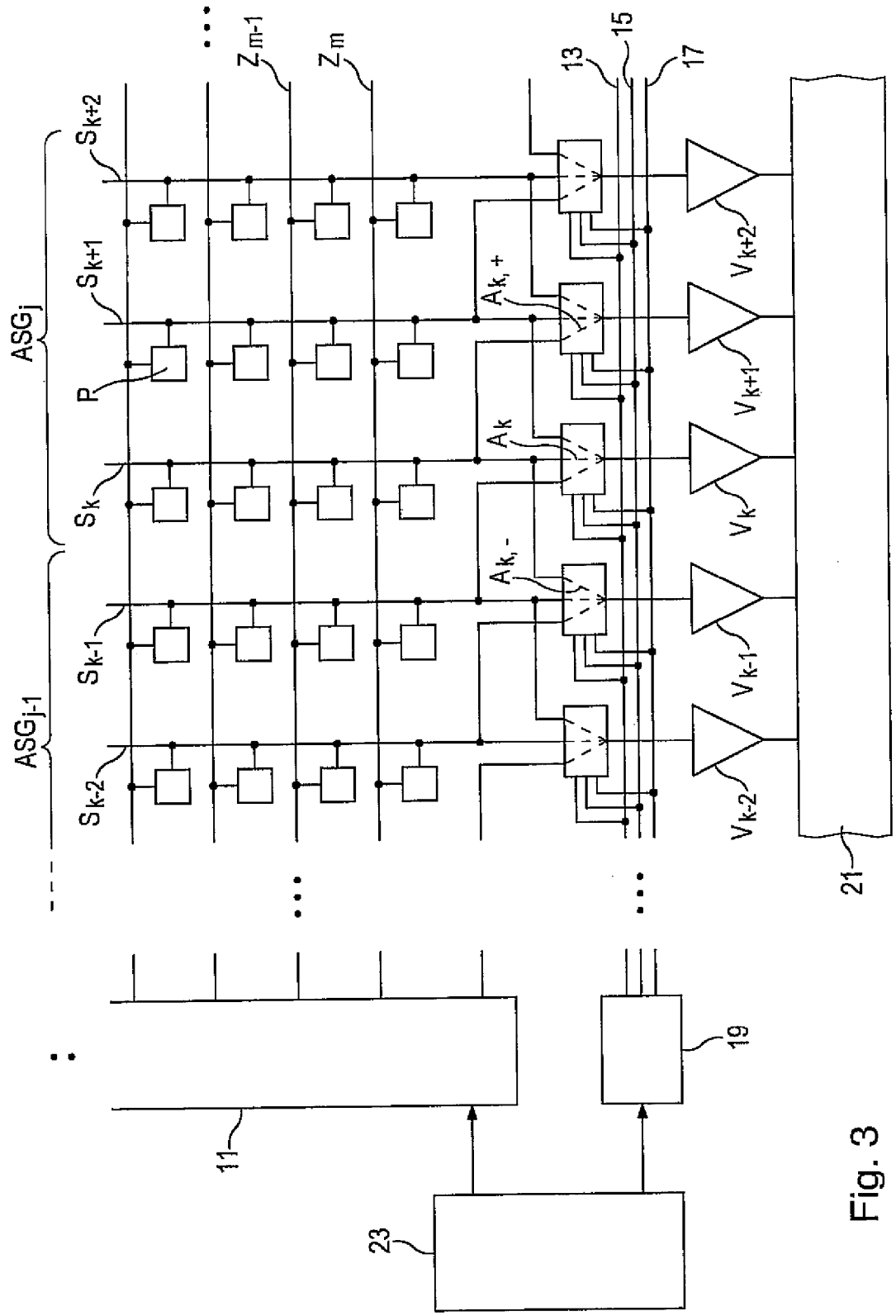

A division of the column lines $S_k$ into readout column groups $ASG_j$ is also possible with respect to the reading out of the image sensor. This is illustrated in FIG. 3 which in turn corresponds to the representation in accordance with FIG. 1, with a plurality of readout column groups $ASG_{j-1}$, $ASG_j$, however, being marked in FIG. 3 of which the readout column group $ASG_{j-1}$ is only shown incompletely. Such a division is in particular sensible when the image sensor has a plurality of output amplifiers to which the column lines $S_k$ should be switched in parallel. In this case, the column lines $S_k$ are switched with respect to each row of the image sensor groupwise to the output amplifier in accordance with the readout column groups $ASG_{j-1}$, $ASG_j$.

It is important that even with such a division of the column lines $S_k$ into readout column groups $ASG_j$ at least some ($V_{k-1}$, $V_k$, $V_{k+2}$) of the column amplifiers $V_k$ are associated with the column lines $S_k$ of a plurality of different readout column groups $ASG_{j-1}$, $ASG_j$. The signals of the column lines $S_k$ of the respective readout column group $ASG_j$ can thus be switched to a column amplifier $V_{k-1}$ of another column group $ASG_{j-1}$ even despite a division of the column lines $S_k$ into readout column groups $ASG_j$ in which the column lines $S_k$ of a respective readout column group $ASG_j$ are preferably arranged directly adjacent to one another. An unwanted perceptibility of group borders is hereby in turn prevented.

It must still be noted with respect to FIG. 3 that the column lines $S_k$ of each readout column group $ASG_j$ can be switched to the associated column amplifiers $V_k$ in accordance with a preset switching scheme, with the switching scheme being substantially identical—with the exception of the marginal regions of the image sensor—for all readout column groups $ASG_{j-1}$, $ASG_j$ of each line of the image sensor and only being varied from row to row. A particularly small switching effort hereby results.

The invention claimed is:

1. An image sensor for electronic cameras having a plurality of light-sensitive pixels (P) which are arranged in rows and columns and whose signals are conducted via a plurality of column lines ($S_{k-2}$, $S_{k-1}$, $S_k$, $S_{k+1}$, $S_{k+2}$) to column amplifiers ($V_{k-2}$, $V_{k-1}$, $V_k$, $V_{k+1}$, $V_{k+2}$), wherein a column amplifier ($V_{k-2}$, $V_{k-1}$, $V_k$, $V_{k+1}$, $V_{k+2}$) is associated with each column line ($S_{k-2}$, $S_{k-1}$, $S_k$, $S_{k+1}$, $S_{k+2}$), characterized in that at least one further column amplifier ($V_{k-1}$, $V_{k+1}$) is associated with the respective column line ($S_k$) and is also associated only with at predetermined number of adjacent column lines ($S_{k-2}$, $S_{k-1}$; $S_{k+1}$, $S_{k+2}$), said predetermined number being less than the total number of column lines, with a switching device (11, 13, 15, 17, 19) being provided to selectively switch the respective column line ($S_k$) to one of the associated column amplifiers ($V_{k-1}$, $V_k$, $V_{k+1}$) and with a control device (23) being provided for the control of the switching device (11, 13, 15, 17, 19), wherein column lines ($S_{k-1}$, $S_k$, $S_{k+1}$) with which the same column amplifier ($V_k$) is associated from a respective association column group ($ZSG_k$), with a plurality of association column groups ($ZSG_{k-1}$, $ZSG_k$, $ZSG_{k+1}$) being provided and with at least some of the association column groups ($ZSG_{k-1}$, $ZSG_k$, $ZSG_{k+1}$) mutually overlapping.

2. An image sensor in accordance with claim 1, characterized in that the control device (23) is made to control the switching device (11, 13, 15, 17, 19) such that the connection association of the column lines ($S_{k-2}$, $S_{k-1}$, $S_k$, $S_{k+1}$, $S_{k+2}$) to the column amplifiers ($V_{-2}$, $V_{-1}$, $V_k$, $V_{k+1}$, $V_{k+2}$) varies from row to row.

3. An image sensor in accordance with claim 1, characterized in that the number of the column amplifiers ($V_{k-2}$, $V_{k-1}$, $V_k$, $V_{k-1}$, $V_{k+2}$) corresponds to the number of the column lines ($S_{k-2}$, $S_{k-1}$, $S_k$, $S_{k+1}$, $S_{k+2}$).

4. An image sensor in accordance with claim 1, characterized in that the number of the column amplifiers ($V_{k-1}$, $V_k$, $V_{k+1}$) which are associated with a respective column line ($S_k$) corresponds to the number of column lines ($S_{k-1}$, $S_k$, $S_{k+1}$) with which each column amplifier ($V_k$) is associated.

5. An image sensor in accordance with claim 1, characterized in that an equal number of column amplifiers ($V_{k-1}$, $V_k$, $V_{k+1}$) is associated with each of the column lines ($S_k$).

6. An image sensor in accordance with claim 1, characterized in that a plurality of column lines, in particular at least four column lines ($S_{k-2}$, $S_{k-1}$, $S_k$, $S_{k+1}$, $S_{k+2}$), are associated with each column amplifier ($V_k$).

7. An image sensor in accordance with claim 1, characterized in that at least some of the column amplifiers ($V_k$) are associated with column lines ($S_{k-1}$, $S_k$, $S_{k+1}$) of different association column groups ($ZSG_{k-1}$, $ZSG_k$, $ZSG_{k+1}$).

8. An image sensor in accordance with claim 1, characterized in that only the column lines ($S_{k-1}$, $S_k$, $S_{k+1}$) of the respective association column group ($ZSG_k$) are connectable to the same column amplifier ($V_k$), wherein the number of column lines ($S_{k-1}$, $S_k$, $S_{k+1}$) of the respective association column group ($ZSG_k$) is smaller than the plurality of column lines ($S_{k-2}$, $S_{k-1}$, $S_k$, $S_{k+1}$, $S_{k+2}$).

9. An image sensor in accordance with claim 1, characterized in that the mutually overlapping association column groups ($ZSG_{k-1}$, $ZSG_k$, $ZSG_{k+1}$) are mutually offset by a respective column.

10. An image sensor in accordance with claim 1, characterized in that the number of the association column groups ($ZSG_{k-1}$, $ZSG_k$, $ZSG_{k+1}$) substantially corresponds to the number of the column amplifiers ($V_{k-2}$, $V_{k-1}$, $V_k$, $V_{k+1}$, $V_{k+2}$).

11. An image sensor in accordance with claim 1, characterized in that the column lines ($S_{k-2}$, $S_{k-1}$, $S_k$, $S_{k+1}$, $S_{k+2}$) of each association column group ($ZSG_{k-1}$, $ZSG_k$, $ZSG_{k+1}$) are arranged directly adjacent to one another.

12. An image sensor in accordance with claim 1, characterized in that the image sensor has a plurality of output amplifiers, with the column lines ($S_{k-2}$, $S_{k-1}$, $S_k$, $S_{k+1}$, $S_{k+2}$) being divided into a plurality of readout column groups ($ASG_{j-1}$, $ASG_j$, $ASG_{j+1}$) such that the column lines ($S_{k-2}$, $S_k$, $S_{k+1}$, $S_{k+2}$) are switched groupwise in accordance with the readout column groups ($ASG_{j-1}$, $ASG_j$) to the output amplifiers with respect to each row of the image sensor, with at least some of the column amplifiers ($V_k$) being associated with column lines ($S_{k-1}$, $S_k$, $S_{k+1}$) of different readout column groups ($ASG_{j-1}$, $ASG_j$).

13. An image sensor in accordance with claim 12, characterized in that the control device (23) is made to control the switching device (11, 13, 15, 17, 19) such that the column lines ($S_k$, $S_{k+1}$, $S_{k+2}$) of each readout column group ($ASG_j$) are switched to the associated column amplifiers ($V_{k-1}$, $V_k$, $V_{k+1}$, $V_{k+2}$) in accordance with a switching scheme, with the switching scheme being substantially identical for all readout column groups ($ASG_{j-1}$, $ASG_j$) of each row of the image sensor.

14. An image sensor in accordance with claim 1, characterized in that each of the column amplifiers ($V_{k-1}$, $V_k$, $V_{k+1}$) associated with the respective column line ($S_k$) has a connection probability with respect to the respective column line ($S_k$) which corresponds to a relative frequency at which the respective column line ($S_k$) is connected to the respective column amplifier ($V_{k-1}$, $V_k$, $V_{k+1}$) with respect to the rows of the image sensor.

15. An image sensor in accordance with claim 14, characterized in that the connection probability is different for at least two of the column amplifiers ($V_{k-1}$, $V_k$; $V_k$, $V_{k+1}$).

16. An image sensor in accordance with claim 14, characterized in that a preferred column amplifier ($V_k$) having a highest connection probability is assigned to each of the column lines ($S_k$).

17. An image sensor in accordance with claim 16, characterized in that the control device (23) is made to control the switching device (11, 13, 15, 17, 19) such that the connection probability of the associated column amplifiers ($V_{k-1}$, $V_{k+1}$) is the smaller with respect to a respective column line ($S_k$) the further the respective column line ($S_k$) is removed from that column line ($S_{k-1}$, $S_{k+1}$) to which the respective column amplifier ($V_{k-1}$, $V_{k+1}$) is assigned as the preferred column amplifier.

18. An image sensor in accordance with claim 16, characterized in that the connection probability of the column amplifiers ($V_{k-1}$, $V_k$, $V_{k+1}$) associated with the respective column line ($S_k$) has a Gaussian distribution with respect to the preferred column amplifier ($V_k$) along the row direction of the image sensor.

19. An image sensor in accordance with claim 1, characterized in that the respective column line ($S_k$) can be connected to each of the associated column amplifiers ($V_{k-1}$, $V_k$, $V_{k+1}$) via a separate switch ($A_{k,-}$, $A_k$, $A_{k,+}$), with the switches connected to a respective column amplifier ($V_{k-1}$, $V_k$, $V_{k+1}$) forming a switch group.

20. An image sensor in accordance with claim 19, characterized in that a column selection circuit (19) is provided by which at least some of the switches ($A_{k,-}$; $A_k$; $A_{k,+}$) can be jointly switched, with the jointly switchable switches ($A_{k,-}$; $A_k$; $A_{k,+}$) including at most one switch ($A_{k,-}$; $A_k$; $A_{k,+}$) of each switch group.

21. A method for the reading out of an image sensor for electronic cameras, wherein the image sensor includes a plurality of light-sensitive pixels (P) which are arranged in rows and columns and whose signals are conducted via a plurality of column lines ($S_{k-2}$, $S_{-1}$, $S_k$, $S_{k+1}$, $S_{k+2}$) to column amplifiers ($V_{k-2}$, $V_{k-1}$, $V_k$, $V_{k+1}$, $V_{k+2}$), wherein a column amplifier ($V_{k-2}$, $V_{k-1}$, $V_k$, $V_{k+1}$, $V_{k+2}$) is associated with each column line ($S_{k-2}$, $S_{k-1}$, $S_k$, $S_{k+1}$, $S_{k+2}$), characterized in that at least one further column amplifier ($V_{k-1}$, $V_{k+1}$), which is also associated only with a predetermined number of adjacent column lines ($S_{k-2}$, $S_{k-1}$; $S_{k+1}$, $S_{k+2}$), said predetermined number being less than the total number of column lines, is associated with the respective column line ($S_k$), with the respective column line ($S_k$) being selectively switched to one of the associated column amplifiers ($V_{k-1}$, $V_k$, $V_{k+1}$), wherein column lines ($S_{k-1}$, $S_k$, $S_{k+1}$) with which the same column amplifier ($V_k$) is associated from a respective association column group ($ZSG_k$), with a plurality of association column groups ($ZSG_{k-1}$, $ZSG_k$, $ZSG_{k+1}$) being provided and with at least some of the association column groups ($ZSG_{k-1}$, $ZSG_k$, $ZSG_{k+1}$) mutually overlapping.

22. An image sensor for electronic cameras having a plurality of light-sensitive pixels (P) which are arranged in rows and columns and whose signals are conducted via a plurality of column lines ($S_{k-2}$, $S_{k-1}$, $S_k$, $S_{k+1}$, $S_{k+2}$) to column amplifiers ($V_{k-2}$, $V_{k-1}$, $V_k$, $V_{k+1}$, $V_{k+2}$), wherein a column amplifier ($V_{k-2}$, $V_{k-1}$, $V_k$, $V_{k+1}$, $V_{k+2}$) is associated with each column line ($S_{k-2}$, $S_{k-1}$, $S_k$, $S_{k+1}$, $S_{k+2}$), characterized in that at least one further column amplifier ($V_{k-1}$, $V_{k+1}$) is associated with the respective column line ($S_k$) and is also associated only with a predetermined number of adjacent column lines ($S_{k-2}$, $S_{k-1}$; $S_{k+1}$, $S_{k+2}$), said predetermined number being less than the total number of column lines, with a switching device (11, 13, 15, 17, 19) being provided to selectively switch the respective column line ($S_k$) to one of the associated column amplifiers ($V_{k-1}$, $V_k$, $V_{k+1}$) and with a control device (23) being provided for the control of the switching device (11, 13, 15, 17, 19), wherein the respective column line ($S_k$) can be connected to each of the associated column amplifiers ($V_{k-1}$, $V_{k+1}$) via a separate switch ($A_{k,-}$, $A_k$, $A_{k,+}$), with the switches connected to the same column amplifier ($V_k$) forming a switch group, wherein the control device (23) is made to control the switches ($A_{k,-}$, $A_k$, $A_{k,+}$) such that the respective switches ($A_{k,-}$, $A_k$, $A_{k,+}$) of the switch groups are jointly switched in accordance with a common switching scheme which is substantially identical for all switch groups.

23. An image sensor in accordance with claim 22, characterized in that the jointly switchable switches ($A_{k,-}$, $A_k$, $A_{k,+}$) include at most one switch of each switch group.

24. An image sensor in accordance with claim 22, characterized in that a common column selection line (13, 15, 17) connects a column selection circuit (19) to each of the jointly switchable switches ($A_{k,-}$, $A_k$, $A_{k,+}$).

25. An image sensor in accordance with claim 22, characterized in that
the control device (23) is made to control the switches ($A_{k,-}, A_k, A_{k,+}$) such that the common switching scheme varies from row to row.

26. An image sensor for electronic cameras having a plurality of light-sensitive pixels (P) which are arranged in rows and columns and whose signals are conducted via a plurality of column lines ($S_{k-2}, S_{k-1}, S_k, S_{k+1}, S_{k+2}$) to column amplifiers ($V_{k-2}, V_{k-1}, V_k, V_{k+1}, V_{k+2}$), wherein a column amplifier ($V_{k-2}, V_{k-1}, V_k, V_{k+1}, V_{k+2}$) is associated with each column line ($S_{k-2}, S_{k-1}, S_k, S_{k+1}, S_{k+2}$),
characterized in that
at least one further column amplifier ($V_{k-1}, V_{k+1}$) is associated with the respective column line ($S_k$) and is simultaneously also associated with at least one other column line ($S_{k-2}, S_{k-1}; S_{k+1}, S_{k+2}$), with a switching device (11, 13, 15, 17, 19) being provided to selectively switch the respective column line ($S_k$) to one of the associated column amplifiers ($V_{k-1}, V_k, V_{k+1}$) and with a control device (23) being provided for the control of the switching device (11, 13, 15, 17, 19),
wherein each of the column amplifiers ($V_{k-1}, V_k, V_{k+1}$) associated with the respective column line ($S_k$) has a connection probability with respect to the respective column line ($S_k$) which corresponds to a relative frequency at which the respective column line ($S_k$) is connected to the respective column amplifier ($V_{k-1}, V_k, V_{k+1}$) with respect to the rows of the image sensor,
wherein a preferred column amplifier ($V_k$) having a highest connection probability is assigned to each of the column lines ($S_k$), and
wherein the control device (23) is made to control the switching device (11, 13, 15, 17, 19) such that the connection probability of the associated column amplifiers ($V_{k-1}, V_{k+1}$) is the smaller with respect to a respective column line ($S_k$) the further the respective column line ($S_k$) is removed from that column line ($S_{k-1}, S_{k+1}$) to which the respective column amplifier ($V_{k-1}, V_{k+1}$) is assigned as the preferred column amplifier.

27. An image sensor for electronic cameras having a plurality of light-sensitive pixels (P) which are arranged in rows and columns and whose signals are conducted via a plurality of column lines ($S_{k-2}, S_{k-1}, S_k, S_{k+2}$) to column amplifiers ($V_{k-2}, V_{k-1}, V_k, V_{k+1}, V_{k+2}$), wherein a column amplifier ($V_{k-2}, V_{k-1}, V_k, V_{k+1}, V_{k+2}$) is associated with each column line ($S_{k-2}, S_{k-1}, S_k, S_{k+1}, S_{k+2}$),
characterized in that
at least one further column amplifier ($V_{k-1}, V_{k+1}$) is associated with the respective column line ($S_k$) and is simultaneously also associated with at least one other column line ($S_{k-2}, S_{k-1}; S_{k+1}, S_{k+2}$), with a switching device (11, 13, 15, 17, 19) being provided to selectively switch the respective column line ($S_k$) to one of the associated column amplifiers ($V_{k-1}, V_k, V_{k+1}$) and with a control device (23) being provided for the control of the switching device (11, 13, 15, 17, 19),
wherein each of the column amplifiers ($V_{k-1}, V_k, V_{k+1}$) associated with the respective column line ($S_k$) has a connection probability with respect to the respective column line ($S_k$) which corresponds to a relative frequency at which the respective column line ($S_k$) is connected to the respective column amplifier ($V_{k-1}, V_k, V_{k+1}$) with respect to the rows of the image sensor,
wherein a preferred column amplifier ($V_k$) having a highest connection probability is assigned to each of the column lines ($S_k$), and
wherein the connection probability of the column amplifiers ($V_{k-1}, V_k, V_{k+1}$) associated with the respective column line ($S_k$) has a Gaussian distribution with respect to the preferred column amplifier ($V_k$) along the row direction of the image sensor.

* * * * *